United States Patent [19]

Swenson

[11] Patent Number: 4,486,969

[45] Date of Patent: Dec. 11, 1984

[54] BOBBER WITH ILLUMINATED SIGNAL

[75] Inventor: Paula S. Swenson, Westminster, Colo.

[73] Assignee: Neptune Products Inc., Denver, Colo.

[21] Appl. No.: 479,883

[22] Filed: Mar. 28, 1983

[51] Int. Cl.³ .............................................. A01K 93/00
[52] U.S. Cl. ...................................................... 43/17
[58] Field of Search ................................... 43/17, 17.5

[56] References Cited

U.S. PATENT DOCUMENTS

| 2,205,352 | 6/1940 | Fisher | 43/17 |
| 3,656,251 | 4/1972 | Snider | 43/17 |
| 3,739,513 | 6/1973 | Durham | 43/17 |
| 4,109,404 | 8/1978 | Preeschl | 43/17 |
| 4,157,627 | 6/1979 | Tschelisnik | 43/17.5 |

FOREIGN PATENT DOCUMENTS

| 853982 | 10/1952 | Fed. Rep. of Germany | 43/17 |
| 640967 | 6/1962 | Italy | 43/17 |

Primary Examiner—Gene P. Crosby
Attorney, Agent, or Firm—Fields, Lewis, Pittenger & Rost

[57] ABSTRACT

A bobber is provided for a fishing line which provides a light signal when a fish strikes. The bobber includes an electrical circuit for the light which has a position-sensitive switch that is activated when the bobber is rotated about its center of gravity due to the striking of a fish. The battery in the bobber serves as a ballast to normally hold the bobber in upright position and posts extend from opposite sides of the bobber which are attached to the fish hook and fishing line and act as moment arms to rotate the bobber when a fish strikes.

19 Claims, 3 Drawing Figures

BOBBER WITH ILLUMINATED SIGNAL

TECHNICAL FIELD

This invention relates to a fishing bobber and more particularly to a fishing bobber which produces a signal when a fish strikes a hook attached to the bobber. The bobber is rotated in the water in response to a strike of a fish causing a position-sensitive switch to close an electric circuit to a signal device within the bobber.

BACKGROUND ART

Over the years various devices have been developed for the fisherman to enhance his enjoyment of fishing as well as his probability of catching fish. Among such developments are the development of a number of bobbers which produce a signal to the fisherman when a fish strikes a hook attached to the bobber. This signal is usually in the form of illumination. While such developed devices have been useful for this intended purpose, most of them suffer one or both of two shortcomings. They are either too complex to be manufactured at a price consistent with the economies of fishing, or they often include a number of movable parts and particularly include a circuit closing device or switch having elements which pass from the electrical circuit through the housing of the device into the water. The switches are, therefore subject to failure due to water passing through the opening provided for the switching means. In addition, devices wherein the water either enters or has a tendency to enter through openings provided for the switching devices can result in corrosion and deterioration of the parts from which the bobber are made, ultimately resulting in a malfunctioning signal device. This is particularly discouraging to the fisherman when he has paid a premium price for a bobber which will signal the strike of a fish and finds that its useful life is quite limited.

Examples of such prior art devices include U.S. Pat. No. 3,739,513 to Durham, Jr. wherein a spherical fishing bobber includes a battery and light bulb separated by a coil spring. A shaft extends from the light bulb through a seal member in the lower end thereof and terminates in an eyelet for attachment to a leader connected to a fish hook. When a fish strikes the hook, the shaft will be pulled downwardly compressing the spring and bringing the light bulb in contact with the battery so that the light bulb is illuminated. U.S. Pat. No. 3,656,251 to Snider, et al. discloses a device which includes a battery and a light and wherein the circuit is completed by the movement of a spring urged plunger in response to a fish striking a hook connected to the plunger. The plunger extends through the bottom of the device from the circuitry to the outer portion which sits in the water. U.S. Pat. No. 4,109,404 to Preeschl discloses a pressurized float wherein a bellows within the float is moved in response to movement of a fish line upon the striking of the fish. This device requires weighing the bait and hook in order to set the calibration of the device before it is used for catching fish. A complex circuit and bellows arrangement is provided wherein the striking of a fish causes a bellow to be compressed and contacts to be closed to cause a light to be illuminated indicating that a fish has struck the line. U.S. Pat. No. 4,157,627 to Tschelisnik discloses a signal floating device having a floatable conductive body therein so that when a fish strikes and pulls the floating body downwardly in the water, the floating conductive device completes an electrical contact to illuminate the device. The lower end of the device is open to the water and in fact the water will float the conductive device up into contact with spaced electrical contacts to complete the circuit when the device is pulled downwardly by a striking fish.

DISCLOSURE OF THE INVENTION

In accordance with this invention, a fishing bobber which provides a signal to a fisherman when a fish strikes is provided. This bobber comprises a hollow, sealed, floatable body member having a vertical axis, ballast means within the body member to maintain the body member in a normal upright position while waiting for a fish to strike, a signal device within the body member, electrical circuit means within the body member connected to the signal device to provide electrical power to the signal device, the circuit means including a position-sensitive switch which is closed when the body member is moved from the upright position about the vertical axis in response to the strike of a fish, hook attaching means on the body member offset to one side of the vertical axis and a fish line attaching means on the body member offset to the opposite side of the vertical axis so that the body member moves from the upright position in response to the strike of a fish to close the position-sensitive switch and energize the signal device.

More particularly, the bobber is a hollow, elongated, transparent, sealed floatable body having a wall formed as an ellipsoid. First and second spaced posts lie along the major axis of the body, each post having an inner end within the body and an outer end extending beyond the respective ends of the body. The battery compartment is provided within a portion of the body which also extends exteriorally beyond the wall of the body and has a removable sealed access means through which the batteries can be inserted. This battery compartment lies along a vertical axis which passes through and is at an acute angle such as 45° to the major axis. The intersection of the two axes is the approximate center of gravity of the bobber. The batteries in the compartment act as a ballast to hold the body in a normal upright position when floating in the water with the major axis of the body at an acute angle, such as 45° to the waterline so that the outer end of one of the posts is above the waterline and the outer end of the other post is below the waterline. A first eyelet for attaching a fish hook is mounted at the outer end of the first post and the second eyelet for attaching a fish line is mounted at the outer end of the second post. A signal device such as a light is mounted within the body and a position-sensitive switch is also mounted within the body so that it is open when the body is in the upright position. The switch is electrically inter-connected with the light and batteries in the battery compartment and is mounted along or generally parallel to the body axis and is attached to the inner end of the first post. When a fish strikes, the posts serve as moment arms so that the force exerted by the fish causes rotation of the body about its center of gravity to rotate the body through an angle, such as 90°, to close the switch and activate the light.

Advantageously, the electrical circuit is completely sealed within the housing and does not rely upon movable elements extending through the body wall for its activation, but rather is controlled by a position-sensitive switch within the body. Thus, the device is economical to manufacture and is not subject to the introduction of water into its electrical parts and therefore, not subject to corrosion and malfunction due to water getting into the body of the bobber.

Additional advantages of this invention will become apparent from the description which follows, taken in conjunction with the accompanying drawings.

BRIEF DESCRIPTION OF THE PREFERRED EMBODIMENT

Figure 1:
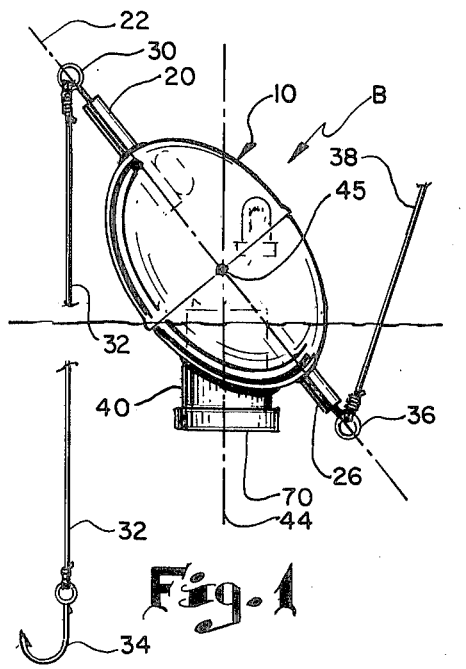
FIG. 1 is a side elevation of the bobber of this invention sitting in the water prior to the strike of a fish.
Figure 3:
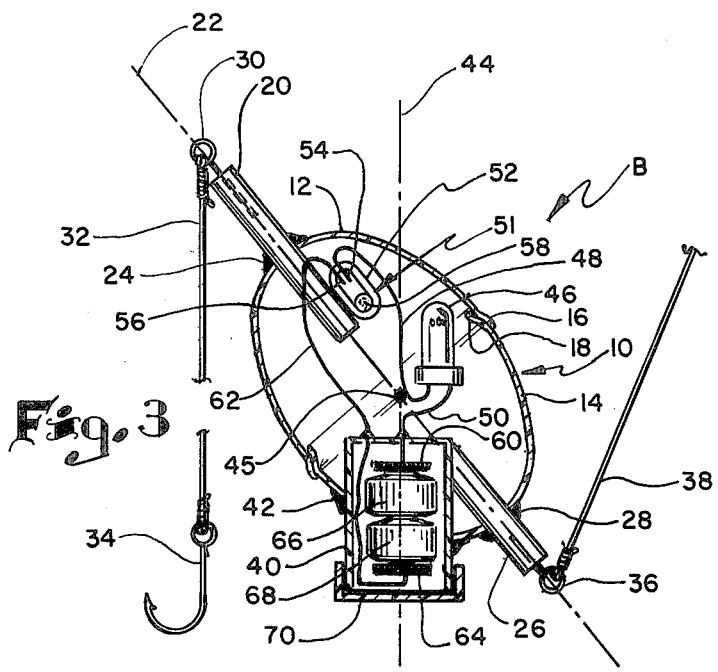
FIG. 3 is an enlarged, vertical section through the bobber of FIG. 1 showing structural details thereof.

In accordance with this invention, a bobber B is provided as shown in FIG. 1 which includes a body member 10 having the general shape of an ellipsoid. As more clearly seen in FIG. 3, body member 10 comprises an upper shell half 12 and a lower shell half 14 whose open ends have overlapping flanges 16 and 18 which are sealed due to a tight frictional fit or by means of a suitable adhesive. Conveniently, the shell halves may be made of a transparent material such as polystyrene or some other light-weight plastic material.

A first or upper post 20 lies along the longitudinal body axis 22 and extends through and is sealed to shell half 12, as by a solvent weld or adhesive 24. A second or lower post 26 is spaced from upper post 20 and also lies along axis 22 with its outer end extending through shell 14 and being sealingly attached thereto as by a solvent weld or adhesive 28. Conveniently, the outer end of post 20 is provided with an eyelet 30 to which a leader 32 connected to fish hook 34 is attached. Also, an eyelet 36 is attached to the outer end of post 26 to which a fish line 38 can be attached. Conveniently, a battery compartment 40 extends through lower shell half 14 and is atached thereto as by a solvent weld or adhesive 42 and has a normally vertical axis 44. Axis 22 and axis 44 intersect at the approximate center of gravity 45 of bobber B.

The circuitry for the device includes a signal device such as light 46 which is supported within body member 10 by any suitable means, not shown, or by the first ends of connecting wires 48 and 50, respectively. A position-sensitive switch 51 has an elongated body 52 which is fixedly supported within bobber B. As shown, switch body 52 is connected to the inner end of upper post 20 with a suitable adhesive so that switch 51 lies generally along or parallel to body axis 22. Switch body 52 has a pair of spaced contacts 54 and 56 in the upper end thereof, and a mercury ball 58 in the lower end thereof. Conveniently, the other end of connecting wire 48 is connected to switch contact 54 and the other end of connecting wire 50 is connected to an upper battery terminal 60 within battery compartment 40. A lead wire 62 has one end connected to switch contact 56 and the other end extends into battery compartment 40 and is connected to a second lower battery terminal 64. Conveniently, a battery, which is illustrated as comprising a pair of battery cells 66 and 68 is connected between the battery terminals 60 and 64, as shown. The batteries may be inserted through an opening in battery compartment 40 which is closed by a water-tight cover 70.

Figure 2:
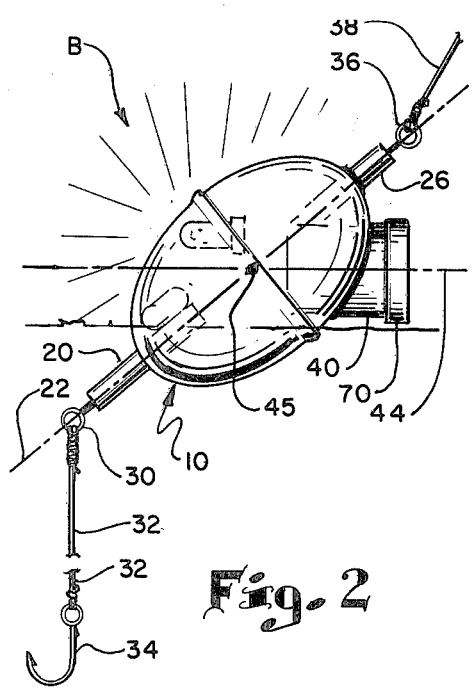
FIG. 2 is a side elevation, similar to FIG. 1, but showing the position of the bobber of this invention after a fish has struck causing the signal device to be activated.

Advantageously, the battery cells 66 and 68 serve as a ballast to maintain bobber B in the upright position. Body axis 22 is at an acute angle with respect to vertical axis 44. Conveniently, this angle may be approximately 45°. As can clearly be seen, when a fish strikes hook 34, due to the momentum provided by upper post 20, the bobber will be pivoted about its center of gravity 45 until body axis 22 and vertical axis 44 swing through an arc such as about 90° wherein upper post 20 is swung down into the water and lower post 26 is swung up out of the water, as best seen in FIG. 2. When in this position, the mercury ball 58 will close contacts 54 and 56 of switch 51, thereby completing the circuit to illuminate light 46.

Since bobber B is completely sealed, the opportunity for water to enter the interior of the bobber is minimized. The ellipsoid shape of the body member 10 provides appropriate buoyancy and a shape which is easy for the fisherman to handle. Posts 20 and 26 serve as moment arms for exerting a torque on bobber B so that it pivots about its center of gravity 45. The device is of simple construction and therefore, economical to manufacture. Furthermore, the battery cells can easily be replaced by removing battery cover 70 to remove old battery cells and install new ones.

The invention has been described in detail with particular reference to a preferred embodiment thereof, but it will be understood that variations and modifications can be effected within the spirit and scope of this invention.

I claim:

1. A bobber for a fishing line which provides a signal to the fisherman when a fish strikes, said bobber comprising:
   a hollow, sealed, floatable body member having a normally vertical axis;
   ballast means within said body member longitudinally aligned with said vertical axis to maintain said body member in a normal upright position in the water while waiting for a fish to strike;
   a signal device within said body member;
   electrical circuit means within said body connected to said signal device to provide electrical power to said signal device, said circuit means including a position-sensitive switch which is closed when said body member is moved from said upright position about said vertical axis in response to the strike of a fish;
   hook attaching means on said body member offset to one side of said vertical axis; and
   fish line attaching means on said body member offset to the opposite side of said vertical axis, said hook attaching means and said fish line attaching means lying along a common axis at an angle to and intersecting said vertical axis so that said body member pivots about a center of gravity from said upright position in response to the strike of a fish to close said position-sensitive switch and energize said signal device.

2. A bobber, as claimed in claim 1, wherein:
   said circuit means includes a battery which comprises at least a part of said ballast means.

3. A bobber, as claimed in claim 1, wherein:
   the intersection of said axes is the center of gravity of said bobber about which said bobber pivots.

4. A bobber, as claimed in claim 1, wherein:
   said common axis is at an angle of approximately 45° to said vertical axis.

5. A bobber, as claimed in claim 1, wherein:
said hook attaching means is above the water line of said body member and said fish line attaching means is below the water line of said body member when said body member is in said normal upright position.

6. A bobber, as claimed in claim 1, wherein:
said position-sensitive switch lies substantially along said common axis.

7. A bobber for a fishing line which provides a signal to the fisherman when a fish strikes, said bobber comprising:
a hollow, elongated, sealed floatable body member having a normally vertical axis and a longitudinal body axis intersecting said vertical axis at an angle thereto establishing a center of gravity, said body axis having an upper end above the water line of said body member and a lower end below the water line of said body member;
a signal device within said body member;
a battery compartment within the lower end of said body member and lying along said normally vertical axis for receiving battery means, said battery means acting as a ballast to maintain said body member in a normally upright position in the water before a fish strikes;
a position-sensitive switch electrically interconnecting said signal device and said battery means, said switch lying substantially along said body axis and being open when said body member is in said upright position;
a first eyelet connected to said body member along said body axis at the upper end thereof for attachment to a fish hook; and
a second eyelet connected to said body along said body axis at the lower end thereof for attachment to a fishing line so that when a fish strikes, said body member rotates to pivot said body about said center of gravity so that the upper end of said body axis is below the lower end of said body axis to close said position-sensitive switch and activate said signal means.

8. A bobber, as claimed in claim 7, further including:
a first fish hook support post lying along said body axis, said post having an outer end to which said first eyelet is attached and an inner end within said body member; and
a second fish line support post lying along said body axis, said second post having an outer end to which said second eyelet is attached and an inner end within said body member spaced from the inner end of said first post.

9. A bobber, as claimed in claim 8, wherein:
said position-sensitive switch is attached to said fish hook support post.

10. A bobber, as claimed in claim 7, wherein:
said body member is an ellipsoid whose major axis lies along said body axis.

11. A bobber, as claimed in claim 10, wherein:
said body member is pivotable through an angle of approximately 90° when a fish strikes.

12. A bobber, as claimed in claim 7, wherein:
said signal device is a light.

13. A bobber for a fishing line which provides a signal to a fisherman when a fish strikes, said bobber comprising:
a hollow, elongated, sealed, floatable body having walls formed as an ellipsoid;
first and second axially-spaced posts lying along the major axis of said body, each post having an inner end within said body and an outer end extending beyond the respective ends of said body;
a battery compartment within a portion of said body which also extends exteriorly beyond the wall of said body and lies along a vertical axis which is at an acute angle to said major axis, the batteries in said compartment acting as a ballast to hold said body in a normal upright position when floating in the water with said major axis of said body at an acute angle to the water line so that the outer end of one of said posts is above the water line and the outer end of the other post is below the water line;
a first eyelet for attaching a fish hook mounted at said outer end of said first post;
a second eyelet for attaching a fish line mounted at said outer end of said second post;
a signal device mounted within said body; and
a position-sensitive switch mounted within said body so that it is open when said body is in said upright position, said switch being electrically interconnected between said signal device and batteries in said battery compartment, said switch closing due to rotation of said body when a fish strikes a fish hook attached to said first post to activate said signal device.

14. A bobber, as claimed in claim 13, wherein:
said body is transparent; and
said signal device is a light.

15. A bobber, as claimed in claim 13, further including:
removable sealed access means in said battery compartment, exteriorly of said body through which the batteries can be inserted.

16. A bobber, as claimed in claim 13, wherein:
said major axis is at an angle of approximately 45° to said vertical axis.

17. A bobber, as claimed in claim 16, wherein:
said body rotates through an angle of approximately 90° when a fish strikes to close said position-sensitive switch.

18. A bobber, as claimed in claim 16; wherein:
the intersection of said axes is the center of gravity of said bobber.

19. A bobber, as claimed in claim 18, wherein:
said bobber is rotated about said center of gravity.

* * * * *